Nov. 11, 1952  K. H. CASSON ET AL  2,617,309
VARIABLE-SPEED FRICTION DRIVE
Filed April 18, 1951  2 SHEETS—SHEET 1

INVENTORS
Kenneth H. Casson
William G. Tyson
By Carlson, Pitzner, Hubbard & Wolfe
ATTORNEYS Nov. 11, 1952  K. H. CASSON ET AL  2,617,309
VARIABLE-SPEED FRICTION DRIVE
Filed April 18, 1951  2 SHEETS—SHEET 2
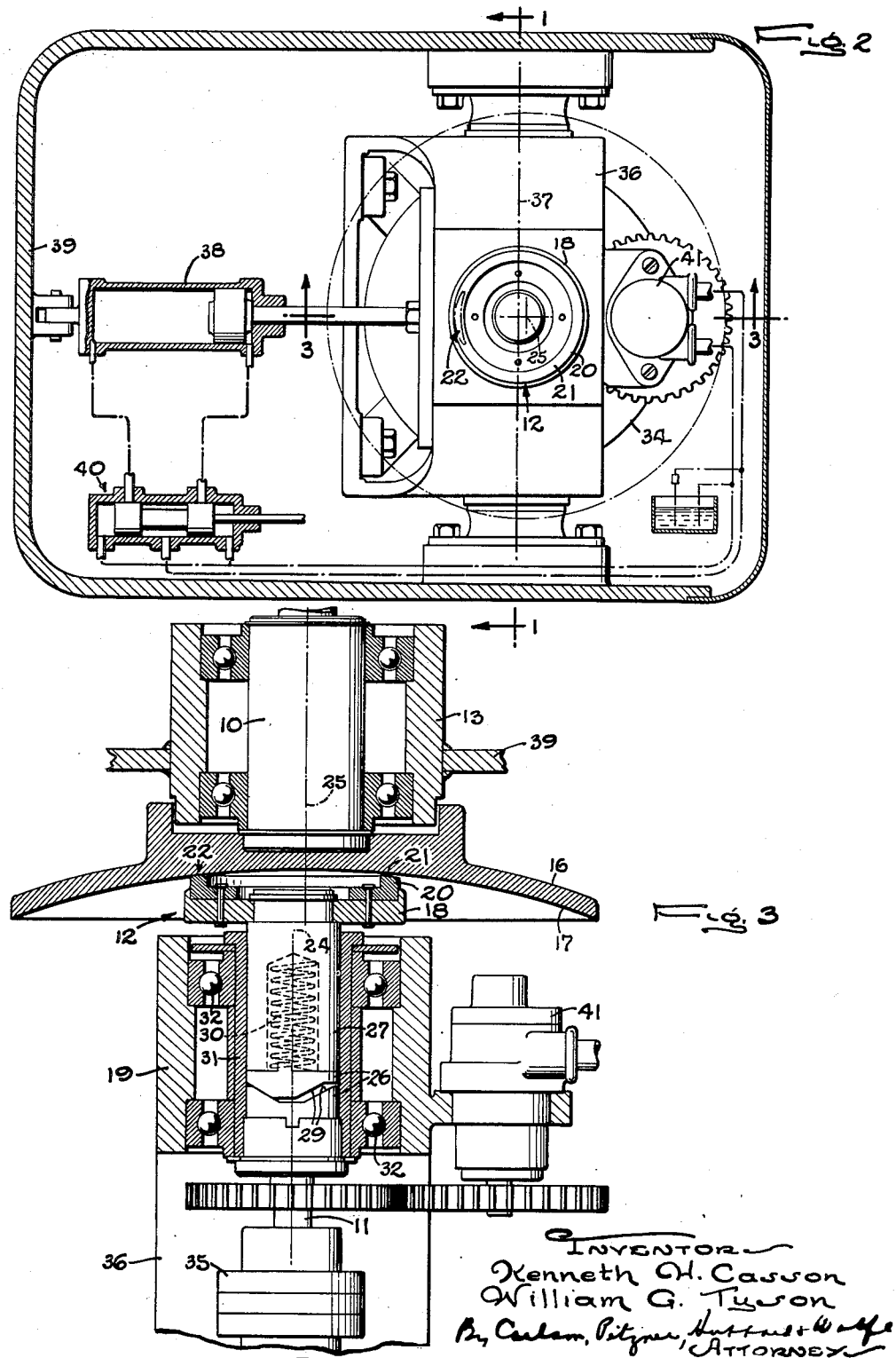

Patented Nov. 11, 1952

2,617,309

UNITED STATES PATENT OFFICE 2,617,309

VARIABLE-SPEED FRICTION DRIVE

Kenneth H. Casson, Winnebago, and William G. Tyson, Rockford, Ill., assignors to Barnes Drill Co., Rockford, Ill., a corporation of Illinois Application April 18, 1951, Serial No. 221,662

9 Claims. (Cl. 74—194)

1

The present invention relates to a variable speed transmission or drive having two coacting rotary friction members mounted on substantially parallel axes and adjustable relative to each other transversely of said axes to establish various selected speed ratios between the driving and driven members.

Variable speed transmissions of this general type are well known and much effort has been expended in the design and development of these mechanisms. However, they have in practice proved to be impractical except for a few specific uses in which the functional requirements to be met were very limited. In instances in which these drives have been used to transmit substantial torque loads over extended periods, they have been subject to operational and structural failures of serious consequence. For example, the frictional surfaces quite frequently overheat causing damage to the friction material and impairment of the dependability of the driving connection. Also, the friction wheels or discs readily develop an intolerable amount of slippage, particularly after prolonged periods of use, which not only reduces the efficiency of the drive but also causes excessive wear and additional heating of the friction surfaces. Because of these and other factors the structural material of the cooperating friction surfaces quickly deteriorates and is soon worn away causing a complete failure of the drive and requiring frequent overhauls. On some occasions drives of this type have been known to "freeze" or "lock up" causing a stalling of the whole mechanism when they are started from a standstill.

With the foregoing in mind, the general object of the present invention is to provide a variable speed transmission of the above type which is well adapted for heavy duty operation over long periods and which is not subject to the structural failures and functional inadequacies previously associated with such drives.

The object of the invention thus generally set forth, together with other and ancillary advantages is attained by the construction and arrangement shown by way of illustration in the accompanying drawings, in which:

Fig. 2 is a horizontal view looking down from line 2—2 of Fig. 1 with certain parts sectioned for clearness.

Fig. 3 is a fragmentary sectional view taken along line 3—3 of Fig. 2 and showing detailed elements of the friction drive on a somewhat enlarged scale.

Figure 1:
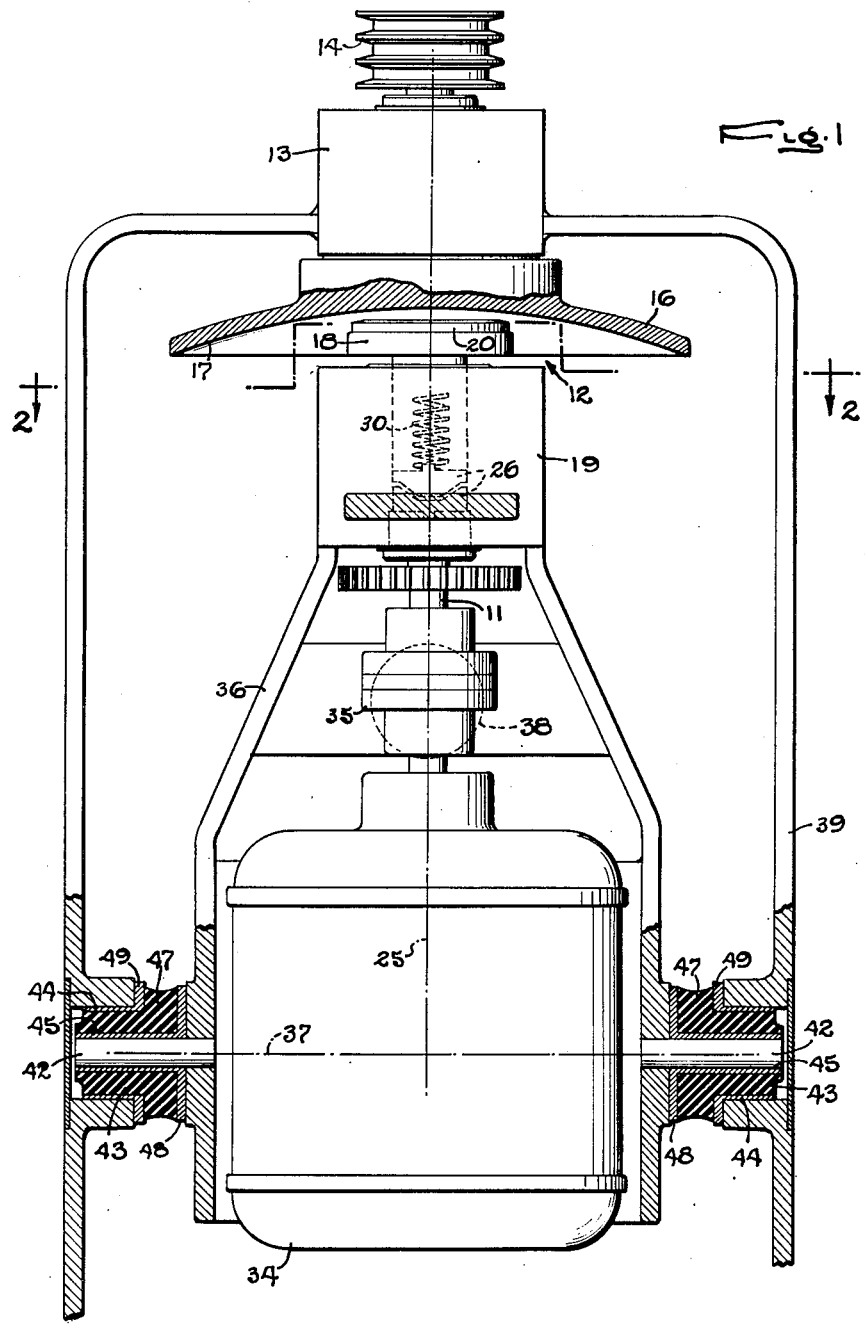
Figure 1 is a vertical view, partially in section, taken generally along line 1—1 of Fig. 2 and showing an exemplary embodiment of the invention.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring more particularly to the drawings, we have shown, for purposes of illustration, a transmission comprising a driven shaft 10 and a drive shaft 11 mounted on substantially parallel axes and connected in driving relationship by a variable speed friction drive 12, Figs. 1 and 3. The driven shaft 10 is journaled in a bearing sleeve 13 and as shown carries a pulley 14 at its upper end. On its lower end is fixed a friction disk 16 constituting the driven member of the friction drive 12 and presenting concave friction face 17, preferably shaped as a segment of a sphere.

In driving relation to the driven disk 16 is the driving member of the transmission in the form of a driving wheel 18 journaled in a head 19 and provided with a ring of friction material 20 presenting a narrow annular surface 21 adapted to frictionally engage the disk face 17. Engagement of the driving surface 21 with the disk face 17 at any one time is confined to a small sector-like area 22 of the driving surface at one side of the ring 20, Figs. 2 and 3. This is achieved by locating the driving wheel 18 in the head 19 in a manner such that the axis of rotation 24 of the wheel is offset laterally relative to the rotational axis 25 of the disk 16. As will presently be described, the head 19 is arranged for lateral movement for the purpose of adjusting the position of the driving member in a direction radially of the driven member for change speed purposes.

Intimate frictional engagement of the driving surface 21 with the face 17 is established by imparting an axial thrust to the wheel 18 biasing it toward the disk 16. Preferably, this force is variable in character to increase and decrease proportionately to changes in the torque load being transmitted by the drive and thereby continuously regulates the frictional forces between the coacting friction surfaces in accordance with this torque load.

In the construction illustrated, this biasing thrust for engaging the friction members is derived from a pair of coacting cams 26 interconnected between the alined ends of the driving shaft 11 and a stubshaft 27 which supports the wheel 18 in the head 19, Fig. 3. As shown, the cams are non-rotatably connected to respective ones of these rotary members and interrelated with each other to transmit torque between the members. The coacting cam surfaces 29 are designed to ride up on each other forcing the cams apart to impart axial force to the stubshaft 27 in response to torsional forces between the cams.

To assure initiation of this camming action upon starting of the drive shaft 11 it is desirable that the stubshaft 27 have some degree of resistance to rotation even before it begins to rotate. While the inherent inertia of the stubshaft and is wheel 18 may be sufficient for this purpose it is preferred that additional initial resistance be provided by maintaining light friction engagement between the friction surface 21 of the wheel 18 and the face 17 of the disk 16 when the transmission is not running. In the present instance this is effected by the insertion of a spring 30 in a well in the end of the stubshaft 27 to react against its cam 26, Fig. 3, the stubshaft being free to move axially relative to the cam and carry the wheel 18 against the face 17.

As shown in Fig. 3, the outer and enlarged end of the drive shaft 11, stubshaft 27 and cams 26 are assembled into a cylindrical sleeve 31 to form a unit supported in the head 19 by suitable bearings 32.

As shown, the drive shaft 11 is power driven by an electric motor 34 connected to the member by a coupling 35, Fig. 1. This motor is mounted in a frame 36 the upper or outer end of which also serves as a mount for the support head 19, the head, in effect, becoming a part of the frame.

To permit adjustment of the drive wheel 18 laterally relative to the disk 16, the frame 36 is pivotally mounted about an axis 37 transverse to the extended rotary axis 25 of the disk 16 and running through or near the center of curvature of the concave face 17 of the friction disk 16. Tipping movement of the frame 36 and its supported parts about the axis 37 is thus effective to adjust the position of the head 19 and the wheel 18 for varying the speed of the driven member 10.

Controlled tipping of the frame in the present instance is provided for by a hydraulic motor 38 interconnected between the frame 36 and a base 39, which in the present instance forms a housing for the transmission, Fig. 2. This motor is controlled by a valve 40 interposed between the motor and an energizing pump 41 driven from the shaft 11.

The present invention is predicated on the discovery that when the supports for the driving and driven members of the variable drive mechanism 12 are solidly mounted, the difficulties first above enumerated inevitably develop; and that when, on the contrary, such supports are mounted so as to be capable of yielding relative to each other in various directions the difficulties are overcome effectively. Such relative yielding of the supports is provided for in the present instance by supporting the frame 36 which carries the driving member 18 of the transmission for yielding movement relative to the housing upon which the driven member 16 is mounted. For this purpose the frame 36 is provided with a pair of oppositely projecting bearing studs 42 supported in the housing through the medium of firm rubber bushings 43. As shown, each bushing is confined between a pair of coaxial sleeves 44 and 45, the former fitting snugly on the stud and the latter fixed in a hollow boss 46 on the housing. Preferably each of the bushings is formed with an inner radial flange 47 similarly confined between radial flanges on the sleeves 48 and 49.

It will be observed that by the construction thus provided the frame 36 is capable of yielding in various directions relative to the stationary housing 39 so as to provide in effect for a limited relative floating movement of the two frames. The exact theoretical explanation as to why such relative movement is effective to overcome the objections incident to a solid and unyielding mounting of the frames relative to each other is not understood. One explanation may be that it serves to compensate for inequalities in the curvature of the driven disk 16 and in the formation of the faces of the cams 26. Also it may compensate for inequalities incident to wear, vibration, etc. In any case, it has been found that with the construction and arrangement employed a practical and durable transmission is obtained.

We claim as our invention:

1. A variable speed transmission comprising, in combination, a housing, a friction disk rotatably mounted in said housing and presenting a concave friction face, a tiltable frame disposed within said housing and having a rotary driving element journaled therein about an axis offset in relation to the axis of said disk, a power shaft mounted on said frame, a coupling drivingly interconnecting said shaft with said driving element, said coupling having cam faces operable to impart an axial force to said driving element in response to the application of torque thereto, said coupling thus forcing said driving element into intimate frictional engagement with said friction face at a radial location on said surface determined by the angular position of said frame, and a pivotal mount supporting said frame from said housing, said mount and said frame floatingly and resiliently supporting said driving element relative to said disk.

2. A variable speed transmission comprising, in combination, a housing, a driven shaft journaled in said housing and having a friction disk fixed to the inner end thereof to present a concave inwardly facing friction surface, a tiltable frame disposed within said housing and having an annular driving element journaled therein about an axis offset in relation to the rotary axis of said driven shaft, a power shaft mounted on said frame in axial alinement with said driving element, a coupling interposed between said power shaft and said driving element for drivingly connecting the shaft and element, said coupling comprising a pair of coacting cams operable to impart an axial biasing force to said driving element in response to the application of torque to said coupling, said coupling thus forcing said driving element into intimate frictional engagement with said friction surface at a radial location on said surface determined by the angular position of said frame, two pivotal supporting mounts for said frame disposed on opposite sides of said frame between said frame and said housing, each of said mounts having a body of resilient material interposed therein to resiliently support said frame member from said housing and thereby resiliently maintain said annular driving element in engagement with said disk surface.

3. A variable speed transmission comprising, in combination, a revoluble friction disk presenting a concave friction surface thereon, a movable support head having a rotary driving element journaled therein and presenting an annular friction surface facing said first surface, a power shaft, a coupling drivingly interconnected between said power shaft and said driving element, said coupling having cam faces operable to impart an axial force to said driving element in response to the application of torque to said coupling, said coupling thus biasing said driving element toward said disk to force said two friction surfaces into mutual engagement at a radial location on said first surface determined by the position of said head, and resilient mounting means yieldably supporting said friction surfaces in mutually engaged position relative to each other.

4. A variable speed friction drive comprising, in combination, a housing, a driven shaft journaled in said housing, a friction disk fixed to said shaft and presenting a concave friction surface thereon, a tiltable frame disposed in said housing, a driving element journaled in said frame about an axis somewhat offset in relation to the axis of said driven member, said element being adapted to drivingly engage said friction surface at selected radial locations determined by the angular position of said frame, driving means operatively connected to said driving element, and resilient cushioning means interposed between said frame and said housing to form a resilient support for said frame and thereby resiliently maintaining said driving element in contact with the driven element.

5. A variable speed transmission comprising, in combination, a revoluble driven member having a friction disk mounted thereon for rotation therewith, a support head disposed opposite the friction face of said disk for angular adjustment about an axis generally transverse to the rotary axis of said driven disk, said angular adjustment causing radial adjustment of said head relative to said disk, an annular driving member journaled in said head to have frictional engagement with said friction face at a location determined by the radial position of said head relative to said disk, driving means operatively connected with said driving member for causing rotation thereof, and flexible mounting means resiliently maintaining said driving head in its engaged position relative to said disk, said mounting means affording resilient support to said head in virtually all directions.

6. A variable speed friction transmission comprising driving and driven members rotatable about laterally spaced axes angularly adjustable for moving the axes toward and away from each other, a shallow dish-shaped surface formed on and rotatable with one of said members, an annular axially facing surface on said other member opposing said first surface and engageable with different annular portions thereof having various radial locations thereon according to the angular relationship of said axes, and means including a body of resilient material yieldably supporting said members in axial gripping engagement under pressure while permitting yieldable tilting of the axis of one of said members.

7. A variable speed friction transmission comprising driving and driven members rotatable about laterally spaced axes angularly adjustable for moving the axes toward and away from each other, a friction element secured to the first of said members and defining a shallow dish-shaped friction surface concentric with said first member, a friction element secured to the second of said members and defining an annular friction surface concentric with said second member and facing said dish-shaped surface for engagement therewith at different radial locations thereon according to the angular relationship of said axes, supporting and driving means operatively connected to one of said members, and yieldable mounting means supporting said last mentioned means and permitting slight angular displacement thereof about the axis of said one member under reaction of forces transmitted between said members.

8. A variable speed friction drive comprising, in combination, a support, a transmission shaft journaled in said support, an annular friction member fixed to said shaft and presenting on the end thereof remote from the body of said shaft a first generally circular friction surface, a tiltable frame disposed on said support for angular adjustment about an axis generally perpendicular to the rotary axis of said shaft, resilient cushioning means interposed between said support and said frame and forming a resilient mount for the latter, a second transmission element journaled in said frame and having a frictional member thereon defining a second generally circular frictional surface on one end thereof opposing said first frictional surface, one of said two frictional surfaces being shaped as a disk and having a dish-shaped configuration, the other of said frictional surfaces being formed as a dish-shaped annulus, said two friction members being adapted to drivingly engage said opposed frictional surfaces at selected radial locations on said disk surface determined by angular positioning of said frame, and said resilient cushioning means serving to yieldably maintain said two friction surfaces in mutual driving engagement.

9. A variable speed transmission comprising, in combination, a revoluble power transmitting member having an annular friction member secured to one end thereof, said friction member defining a first circular friction surface on the end thereof facing away from the body of said member, a support head disposed opposite said friction surface, means supporting said head for angular adjustment about an axis generally transverse to the rotary axis of said power transmitting member, said angular adjustment effecting radial adjustment of said head relative to said friction surface, an annular friction member journaled in said head and defining a second frictional surface facing said first frictional surface to have frictional engagement therewith at different radial locations thereon determined by the angular positioning of said head, and flexible mounting means resiliently supporting said head to yieldably maintain said second frictional surface in torque transmitting engagement with said first frictional surface.

KENNETH H. CASSON.
WILLIAM G. TYSON.

REFERENCES CITED

The following references are of record in the file of this patent:

UNITED STATES PATENTS

| Number | Name | Date |
| --- | --- | --- |
| 1,772,593 | Robertson | Aug. 12, 1930 |
| 2,111,422 | Fawick | Mar. 15, 1938 |
| 2,312,798 | Carrington | Mar. 2, 1943 |

FOREIGN PATENTS

| Number | Country | Date |
| --- | --- | --- |
| 837,117 | France | Nov. 3, 1938 |
| 60,907 | Netherlands | Apr. 15, 1948 |
| 61,641 | Netherlands | Sept. 15, 1948 |